US006865957B1

(12) United States Patent
Hughes et al.

(10) Patent No.: US 6,865,957 B1
(45) Date of Patent: Mar. 15, 2005

(54) ADAPTABLE FLUID MASS FLOW METER DEVICE

(76) Inventors: Nathaniel Hughes, 1934 E. Sonora Rd., Palm Springs, CA (US) 92264; Leon Shaw, 2428 28$^{th}$ St., Santa Monica, CA (US) 90405

( * ) Notice: Subject to any disclaimer, the term of this patent is extended or adjusted under 35 U.S.C. 154(b) by 0 days.

(21) Appl. No.: 10/410,685

(22) Filed: Apr. 9, 2003

Related U.S. Application Data

(63) Continuation-in-part of application No. 10/373,302, filed on Feb. 26, 2003, now abandoned.
(60) Provisional application No. 60/383,901, filed on May 29, 2002, provisional application No. 60/374,249, filed on Apr. 18, 2002, and provisional application No. 60/373,549, filed on Apr. 17, 2002.

(51) Int. Cl.[7] .................................................. G01F 1/37

(52) U.S. Cl. .................................................... 73/861.52

(58) Field of Search ......................... 73/861.42, 861.47, 73/861.52, 861.55, 861.54, 861, 861.15, 861.02; 128/200.14, 200.16

(56) References Cited

U.S. PATENT DOCUMENTS 4,083,245 A * 4/1978 Osborn .................... 73/861.53
4,333,355 A * 6/1982 Dacus et al. ............. 73/861.91
4,638,672 A 1/1987 McCall
4,812,049 A 3/1989 McCall
5,363,699 A 11/1994 McCall
5,379,650 A * 1/1995 Kofoed et al. ........... 73/861.52
5,445,035 A * 8/1995 Delajoud ................. 73/861.52
5,814,738 A 9/1998 Pinkerton et al.
6,164,141 A * 12/2000 Chalvignac et al. ..... 73/861.52
6,314,821 B1 * 11/2001 Allan ...................... 73/861.52
2003/0019301 A1 * 1/2003 Richards et al. ......... 73/861.53
2003/0140921 A1 * 7/2003 Smith et al. ........... 128/200.14

* cited by examiner

*Primary Examiner*—Edward Lefkowitz
*Assistant Examiner*—T Miller
(74) *Attorney, Agent, or Firm*—Theodore J. Bielen, Jr.

(57) ABSTRACT

A mass flow meter device utilizing a housing having a wall portion forming a chamber with an entrance and exit for passing fluid through the same. A body is located within the chamber and is composed of a first conical portion, a second conical portion, and a cylindrical portion positioned intermediate the first and second conical portions. The body is held within the chamber in a standard or reverse direction. A first pressure probe or sensor measures the fluid pressure at the apex of the first conical portion while a second pressure probe or sensor obtains a second pressure measurement at the cylindrical portion of the body. The comparison of the first and second pressure measurements serves as an indication for the mass flow of fluid through the housing. The flow meter device may be adapted to existing fluid sources such as aerosol generators.

19 Claims, 10 Drawing Sheets

ADAPTABLE FLUID MASS FLOW METER DEVICE

CROSS-REFERENCES TO RELATED APPLICATIONS

Figure 1:
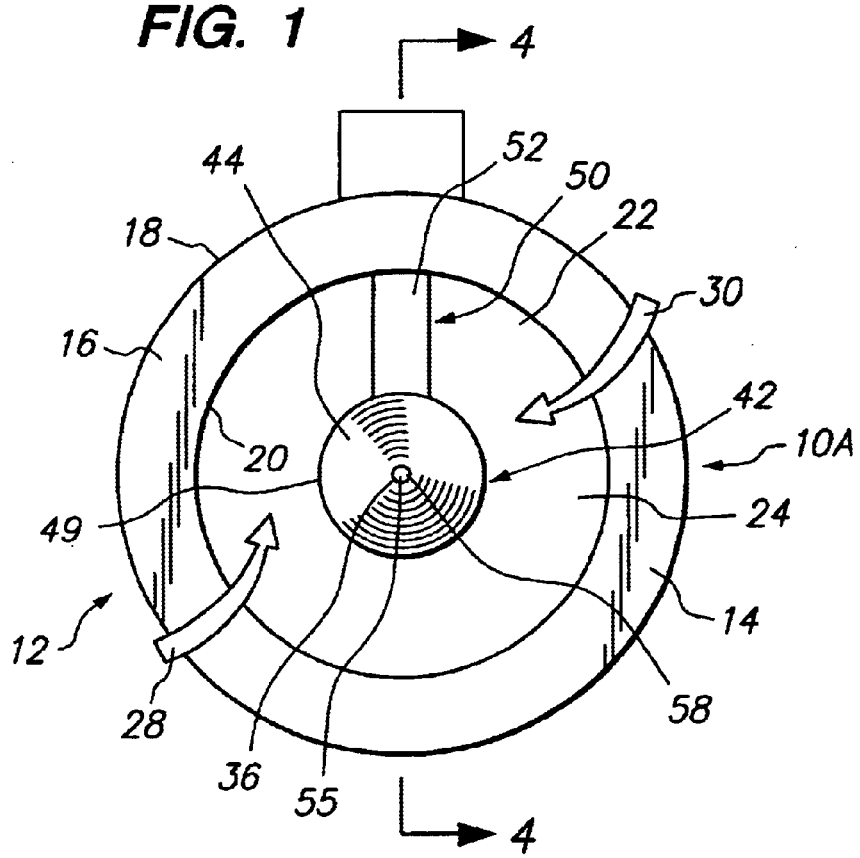
Figure 2:
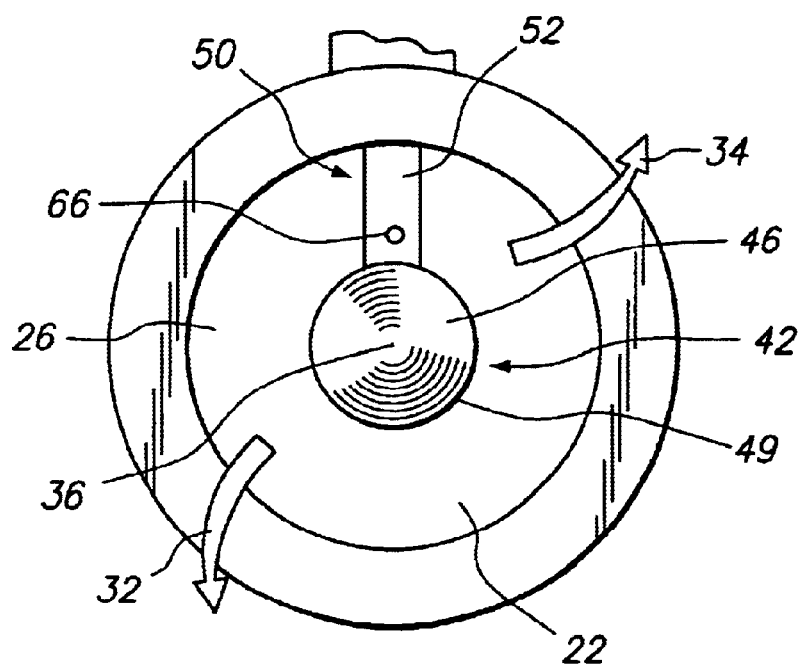
Figure 3:
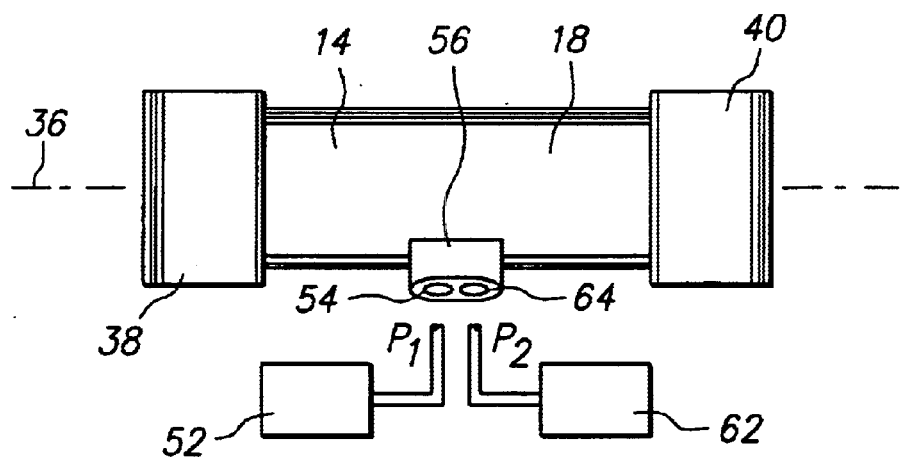

The present application claims the benefit of provisional application Ser. No. 60/383,901, filed 29 May 2002, provisional application Ser. No. 60/374,249, filed 18 Apr. 2002, and provisional application 60/373,549, filed 17 Apr. 2002 and is a continuation-in-part of non-provisional application Ser. No. 10/373,302, filed 26 Feb. 2003 now abandoned.

BACKGROUND OF THE INVENTION

The present invention relates to a novel and useful fluid mass flow metering device.

Mass flow meters are often used in conjunction with other mechanical entities such as micro-atomizers, oxygen delivery systems, valve controlled devices, pressure regulators, compressors, and pumps.

In the past, mass flow meters have taken various forms. For example, the coriolis system requires high pressures to operate and is limited by the density of the fluids being measured. Coriolis measurement devices are also very expensive to manufacture since they require adjunct devices and computers to determine density. Also, coriolis flow meters do not measure low-density gases in a reliable manner and require high pressure to operate.

Non-intrusive magnetic flow meters, although not interfering with the flow being measured, require an enormous amount of electronic equipment to measure the magnetic field change of a fluid, based on magnetic flux. Also, a magnetic medium, such as powdered metal, must be placed in the fluid to amplify sensitivity of this system.

Doppler sonic effect flow meters, again, are non-obtrusive, however, and associated density determining mechanisms are required to measure flow in a conduit are extremely complicated and expensive.

Thermal mass meters employ a bypass capillary heating system relative to the main flow conduit. In this regard, the capillary mechanism must be maintained in an extremely clean condition. Also, determination of the exact type and density of the fluid being measured is a prerequisite to accurate measurements. In addition, thermal mass meters are very expensive to manufacture and maintain.

In the past, objects of a defined shape have been placed in conduits to effect the fluid flow. For example, U.S. Pat. 4,812,049 describes a fluid dispersing means in which a cone like member is placed in a conduit or pipe to disperse fluid component by creating turbulent flow downstream from the element.

U.S. Pat. Nos. 5,363,699 and 5,814,738 describe fluid flow meters in which flow measurements are taken along a conduit in conjunction with one or more displacement members.

U.S. Pat. No. 4,638,672 teaches a fluid flow meter where a fluid flow member of double conical configuration is placed in the fluid to determine the velocity profile. Fluid is passed through an auxiliary flow tube in order to affect measurement by a flow meter.

A fluid mass flow metering device which produces accurate measurements over a wide range of fluid flow rates would be a notable advance in the field of measuring instruments.

BRIEF SUMMARY OF THE INVENTION

In accordance with the present invention a novel and useful mass flow meter device is herein provided.

The device of the present invention uses a container or housing having a wall portion forming a chamber. The chamber possesses an entrance and an exit for the passing of fluids therethrough. The housing is preferably a hollow circular cylinder flow tube with a circular cross-sectional configuration. The housing may include appropriate fittings to communicate with a source of fluid and an exit conduit for the fluid following measurement.

A module or body is located in the chamber of the housing. The body includes a first conical portion positioned adjacent the chamber entrance, a second conical portion positioned adjacent the chamber exit, and a cylindrical portion intermediately positioned relative to the first and second conical portions. The body is formed as a unitary member and may be machined or fashioned from a unitary mass or blank of material. The body is formed to lie along an axis which coincides with the central axis of the housing when the housing is formed into a cylindrical tube. In essence, the body fashions the chamber into an annulus having a relatively large flow passage.

Support means is also found in the present invention for holding the body in a coaxial configuration, with the housing noted above, within the chamber of the housing. Such support means may take the form of a pylon or pedestal which is connected to an inner wall portion of the housing and depends therefrom. The pedestal is formed in a sleek configuration to minimize its effect the fluid flow through the chamber.

A first pressure probe or sensor is employed to obtain a pressure measurement at the apex of the first conical portion of the body facing the entrance to the chamber of the housing. The first pressure probe includes a passageway through the housing, the pylon, and a portion of the body. The passageway terminates in an aperture at the apex of the first conical portion of the body to obtain a dynamic pressure reading at this point. A second pressure probe also passes through the wall of the body, and the pylon and terminates in an aperture to obtain a pressure measurement adjacent the cylindrical portion of the body. The passageways of the first and second pressure probes each lead to a conventional sensor which provides a numerical value of the pressure in the chamber of the housing at the points noted. Each pressure reading on the body located in the chamber of the housing represents a dynamic pressure due to a stable vortex trail which is generated by the body located in the chamber. The flow body may be positioned in a "reverse orientation" within the housing chamber such that he first conical portion faces the exit thereof. Accurate mass flow determinations may be obtained with the flow body lying in this reverse orientation. The flow of fluid through the chamber and around the body within the chamber is believed to be streamline and smooth.

The pressure readings, $P_1$ and $P_2$, are representative of the quantitative and qualitative characteristics of the fluid flowing through the chamber of the housing. Plotting of the difference between the pressure readings, $P_1-P_2$, to known mass flows through the chamber of the housing results in a graph or table for a particular fluid i.e. air, argon, water, alcohol, and the like, at particular temperatures and pressures, with respect to a particular sized housing, body within the housing, and the annulus through the chamber. The difference in the pressure readings, $P_1-P_2$, may be automatically determined by a comparator and translated into a determination of mass flow by a proper algorithm.

In certain cases a fluid flow device may be employed as a retrofitted item to measure mass flow. In such instances a housing containing the flow body above described may be fitted into an in-line or tapped line fluid exit. Again, the $P_1-P_2$ differential would serves as a basis for mass measurements which may be performed automatically and instantaneously. In addition, such retrofitting may alter the fluid exit flow as well as measuring the mass flow. For example, medical and non-medical aerosol delivery systems may be retrofitted to slow and enhance the egressing aerosol.

It is therefore an object of the present invention to provide a mass flow meter device which operates with minimal components and provides accurate and repeatable measurements.

Another object of the present invention is to provide a fluid mass flow meter device which consistently obtains mass flow measurements through a large range of fluid velocities in a flow stream being measured.

A further object of the present invention is to provide a fluid mass flow meter device which closely controls the flow patterns of fluids and generates a stable, streamline, vortex trail to achieve such results.

Yet another object of the present invention is to provide a fluid mass flow meter device which minimizes viscous friction effects, boundary layer effects, and exhibits Reynolds number immunity.

Another object of the present invention is to provide a fluid mass flow meter device which is efficient and inexpensive to manufacture and operate.

Another object of the present invention is to provide a fluid mass flow meter device which is not affected by external vibration, noise, or the influence of gravity during its operation.

Another object of the present invention is to provide a fluid mass flow meter device which is not substantially upset by compressibility effects or back pressure changes.

A further object of the present invention is to provide a fluid mass flow meter device which is not substantially prohibited from obtaining accurate measurements by unstable flow distortions, such as "vena contracts" or vortex shedding, which affect conventional volumetric flow meters.

Another object of the present invention is to provide a fluid mass flow meter device which does not require restrictive contours, flow areas or orifices to operate.

Another object of the present invention is to provide a fluid mass flow meter device which does not require the use of flow condition dependent mathematical adjustment coefficients to its measurements in order to obtain accurate mass flow determinations.

Another object of the present invention is to provide a fluid mass flow meter device which does not require the generation of a magnetic field or minimum fluid pressures in order to operate effectively.

Another object of the present invention is to provide a fluid mass flow meter device which is relatively inexpensive to manufacture and function.

A further object of the present invention is to provide a fluid mass flow meter device which may be used to measure mass flow in liquids or gases.

A further object of the present invention is to provide a fluid mass flow meter device which includes a flow body which generates a pressure differential and which may be positioned in standard and reverse orientations with a flow chamber.

Another object of the present invention is to provide a fluid mass flow meter device which does not require preconditioning of the inlet stream by adding lengths of conduit, providing anti-swirl mechanisms and the like.

Another object of the present invention is to retrofit a fluid mass flow meter to existing fluid systems in order to determine mass flow.

A further object of the present invention is to retrofit a fluid mass flow device to medical and non-medical aerosol systems to measure mass flow and to slow and enhance the aerosol.

The invention possesses other objects and advantages especially as concerns particular characteristics and features thereof which will become apparent as the specification continues.

BRIEF DESCRIPTION OF THE SEVERAL VIEWS OF THE DRAWING

FIG. 1 is a front elevational view of the device of the present invention.

FIG. 2 is a rear elevational view of the device of the present invention.

FIG. 3 is a side elevational view of the device of the present invention with the pressure sensors depicted in broken configuration and the body of the device being rotated downwardly from the renditions of FIGS. 1 and 2.

FIG. 4 is a sectional view taken along line 4—4 of FIG. 1.

FIG. 5 is a schematic flow diagram depicting the process employed in determining mass flow with the device of the present invention.

FIG. 6 is a graph depicting the mass flow determination flow results using the device of the present invention with air and argon gases.

FIG. 7 is a graph representing the mass flow determinations described in Example II.

FIG. 8 is a graph depicting the data of FIG. 7 in which each of the measured $P_1$–$P_2$ values are shown as the square root.

FIG. 9 is a graph depicting the mass flow determinations described in Example II.

FIG. 10 is a graph depicting the data of FIG. 9 in which each of the measured $P_1$–$P_2$ values are shown as the square root.

FIG. 11 is a sectional view of the device of the present application in which the flow body orientation is reversed within the flow chamber from the orientation of FIG. 4.

FIG. 12 is a graph depicting the mass flow determinations described in Example III.

FIG. 13 is a graph depicting the data of FIG. 12 in which each of the measured $P_1$–$P_2$ values are shown as the square root.

FIG. 14 is a graph depicting the mass flow determinations described in Example III with the device illustrated in FIG. 11.

FIG. 15 is a graph depicting the data of FIG. 14 in which each of the measured $P_1$–$P_2$ values are shown as the square root.

FIG. 16 is a sectional view of the device of the present invention being used with an orifice plate, described in Example IV.

FIG. 17 is a graph representing the measurements of Example IV.

FIG. 18 is a graph representing the measurements of Example IV.

Figure 19:
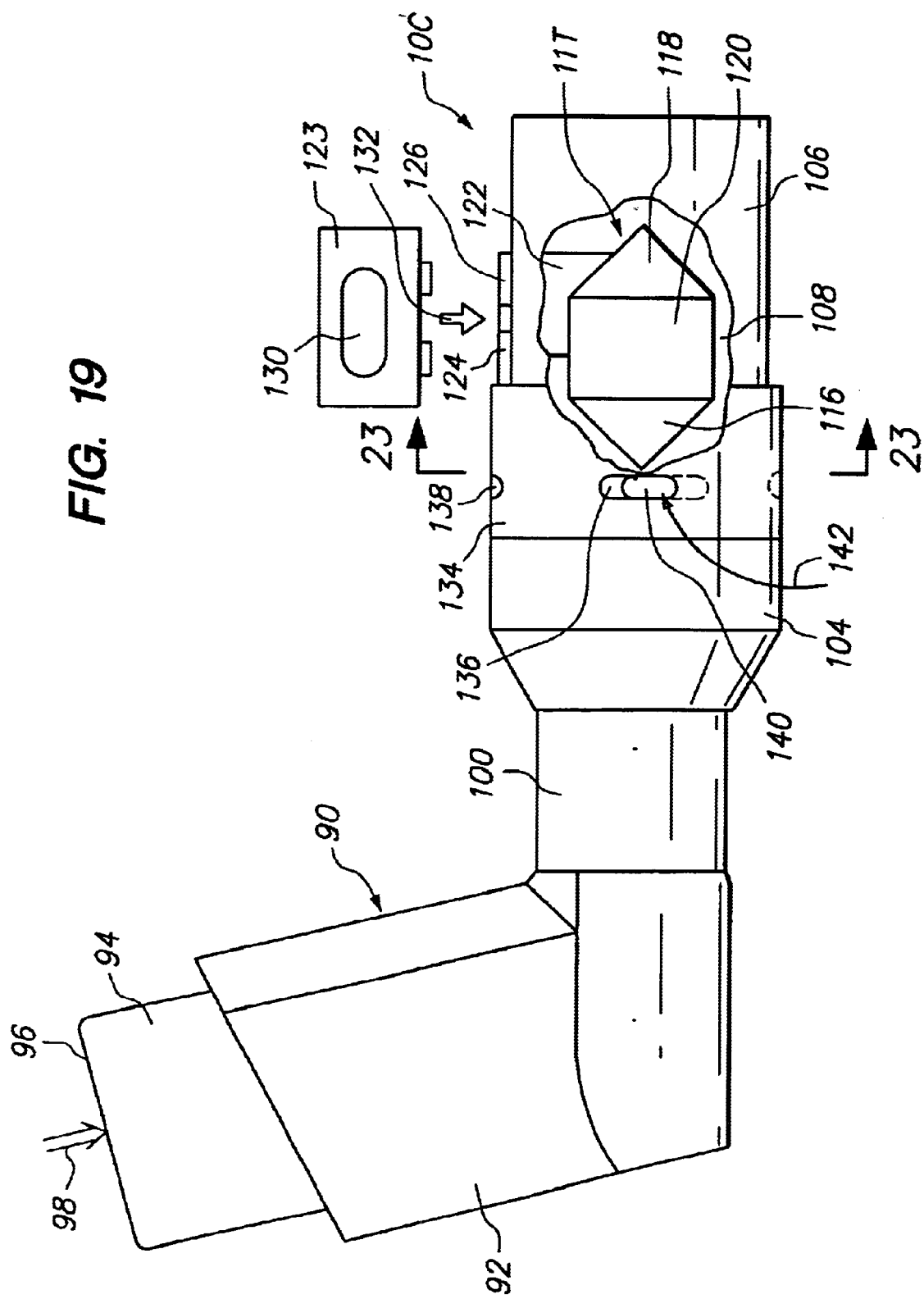

FIG. 19 is a side elevational view of another embodiment of the device of the present invention retrofitted to a medical aerosol delivery system.

Figure 6:
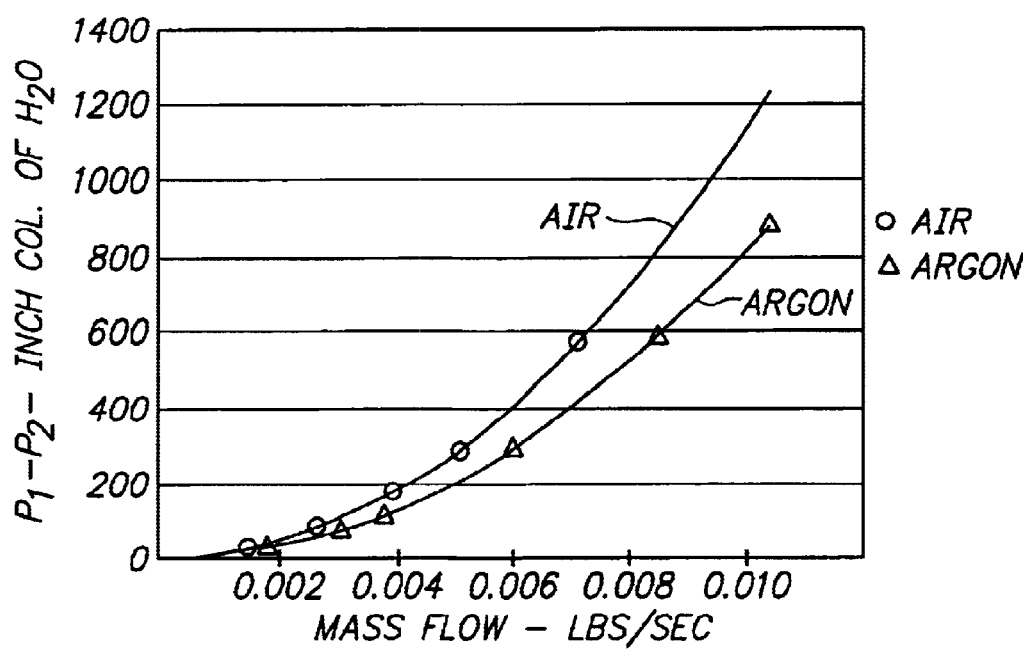
Figure 20:
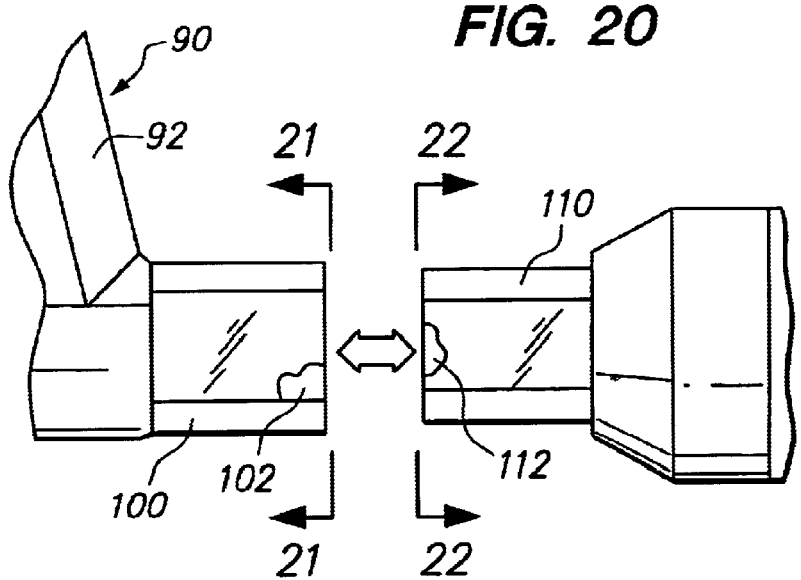

FIG. 20 is a partial exploded side elevational view of the prior art aerosol delivery system and the flow modifying device of the present invention.

FIG. 21 is a view taken along line 21—21 of FIG. 20.

FIG. 22 is a view taken along line 22—22 of FIG. 20.

FIG. 23 is a sectional view taken along line 23—23 of FIG. 20.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

A preferred embodiment of the present invention is shown in its entirety and is noted by reference character 10 in the drawings, followed by an upper case letter to denote various embodiments of the present invention. Fluid mass flow metering device 10A includes as one of its elements a housing 12, which is illustrated as a cylindrical tube and may be constructed of any rigid or semi rigid material. Tube 14 possesses a wall portion 16 having an outer surface 18 and an inner surface 20. Wall portion 16 forms a chamber 22 which possesses an entrance 24 and an exit 26, defined by the normal passage of fluids through chamber 22. Directional arrows 28 and 30 of FIG. 1, as well as directional arrows 32 and 34 of FIG. 2 illustrate the movement of fluid through and from chamber 22 via entrance 24 and exit 26 during the measuring process of device 10A. Cylindrical tube 14, serving as containment or housing 12, lies along central axis 36. Cylinder tube 14 is also provided with end fittings 38 and 40 to allow interconnection to a source of fluid and to a conduit or like entity directing fluid away from device 10. Device 10A is intended to determine mass flow of liquids or gases which will be discussed in more detail as the specification continues.

Device 10A also entails the utilization of a flow body 42. Although flow body 42 is generally a unitary member, flow body 42 includes three portions. First conical portion 44 of flow body 42 faces entrance 24 of chamber 22. Second conical portion 46 faces exit 26 of chamber 22. First and second conical portions 44 and 46, respectively, includes converging side portions at about a forty-five degree angle. However, other angles may be employed with respect to first and second conical portions 44 and 46. Cylindrical portion 48 lies intermediate first conical portion 44 and second conical portion 46. The bases of first conical portion 44 and second conical portion 46 are of the same diameter, in the embodiment depicted in the drawings, and is similar the circular top and base of cylindrical portion 48. The result is a smooth outer surface 49 which produces steady vortex trail. Flow a body 42 and tube 14 create an annulus configuration of chamber 22 through which the fluid being measured by device 10 travels. The cross-sectional area of chamber 22 is predetermined ("equivalent area" or "equivalent diameter") to maximize the operation of device 10A.

Flow body 42 is supported in chamber 22 by support means 50. Support means 50 may take the form of a appendage or pylon 52 which extends inwardly toward axis 36 and is connected to wall portion 16, specifically inner surface 20 thereof. Pylon 52 is relatively slim compared to flow body 42 within chamber 22.

A first pressure sensor or probe 52, FIGS. 3 and 4, includes a passageway 54 which originates in boss 56 fixed to outer surface 18 of cylindrical tube 14. Passageway 54 extends through wall portion 16 of tube 14, pylon 52, and first conical portion 44 of flow body 42. Passageway 54 terminates in a aperture 58 the apex 55 of first conical portion 44 which faces entrance 24 of chamber 22. Directional arrow 60 indicates the flow of fluid to aperture 58 which produces pressure reading $P_1$. Of course, pressure probe 52 also includes conventional instruments which quantifies pressure measurement $P_1$. Likewise, second pressure sensor or probe 62 is formed with a passageway 64 that extends through boss 56 wall portion 16 of tube 14, and a portion of pylon 52. Aperture 66 in pylon 52 faces exit 26 and measures the pressure, $P_2$, at cylindrical portion 48 of flow body 42. Dynamic pressure measurements, $P_1$ and $P_2$, result from the stable and smooth vortex trail generated by flow body 42. Again, directional arrows 68 and 70, FIG. 4, indicate the flow of fluid through chamber or annulus 22 during the measuring process employed with device 10.

Dynamic pressures $P_1$ and $P_2$ are theorized to follow the following equations:

$$\text{Dynamic Pressure } P_1 \text{ or } P_2=\rho\Delta V^2/2$$

where

ρ=the density of fluid measured, and

V=the velocity the fluid measured the velocity differential across device 10 is given as:

$$\Delta V=\sqrt{\Delta P\text{static}}/\rho$$

Where $A\epsilon$ is the equivalent area of chamber 22.

$$A\epsilon=\pi/4 d\epsilon^2$$

where $d\epsilon$ is the equivalent diameter of chamber 22.

Since the velocity is squared in the Dynamic Pressure equation above, the pressure differential value, $P_1$–$P_2$, is dominated by the fourth power of the equivalent diameter.

In operation, with reference to FIG. 5, a fluid source 72 feeds housing 12 of device 10A, specifically through chamber or annulus 22 of cylindrical tube 14. Cylindrical body 42 creates a smooth stable vortex trail and generates dynamic pressures $P_1$ and $P_2$ by the way of pressure probes 52 and 62. Such "vortex generated differential pressures" are quite prominent and easily readable by conventional pressure sensors. The difference between pressures $P_1$ and $P_2$ are then determined either manually or automatically and, through the use of tables or graphs determine the mass flow of fluid through device 10. That is to say, for a particular pressure differential, $P_1$–$P_2$, by employing a particular sized housing 12 with chamber or annulus 22, and at a particular ambient pressure and temperature, a flow rate is measured, correlated, and recorded for future use.

The following example represents a particular aspect of the present invention but is not intended to restrict the invention in any manner.

EXAMPLE I

The device 10A as shown in FIGS. 1–4 was employed to determine the mass flows of the gases air and argon at room temperature and at atmosphere pressure. Argon is known to be 1.4 times as heavy as air and was employed for the sake of comparison. Device 10A was connected to a pair of pressure sensors, Model No. 860 manufactured by Autotran Incorporated of Eden Prairie, Minn. The pressure sensors were then used to determine $P_1$ and $P_2$ at the aperture 58 of passageway 54 and the aperture 66 of passageway 64, respectively, FIG. 4. The mass flow in pounds per second was then determined by flow rates traced through device 10A and correlated to the pressure differential, $P_1-P_2$. FIG. 6 represents the results of these tests for air and argon. Thus, for a particular sized housing, flow body 42, and chamber or annulus 22 a curve or slope was plotted for each gas. It was concluded that the curves may be extrapolated or interpolated to produce values of mass flow of either gas for a particular pressure differential, $P_1-P_2$.

EXAMPLE II

Additional testing of the system of the present invention was accomplished using a Sensym pressure sensor employing the embodiment 10A of the device depicted in FIG. 1. The sensor was not temperature or pressure compensated and required average readings based on an up and down pulsation at any setting. However, consistent measurements were obtained since such pulsations were stable. Such temperature and pressure variations are believed to cause errors ranging from 15 to 16 percent. In addition, the anemometer of the Sensym pressure sensor possesses an accuracy of plus or minus three percent of full scale.

Figure 7:
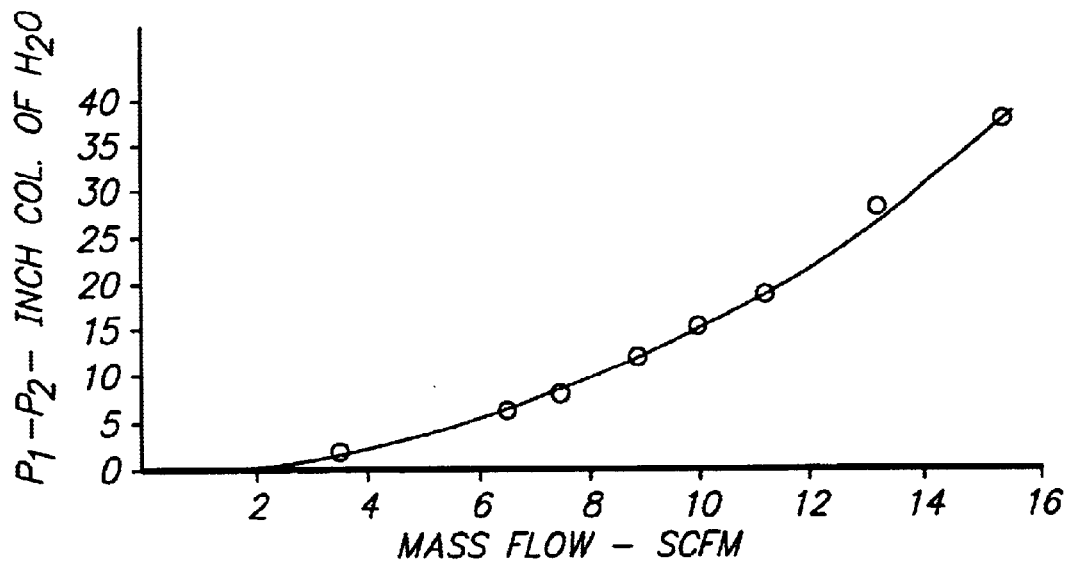

Using a flow body 42, supported in a housing 12 identified as a 0.500-0.400 plastic unit, the mass flows for air were calculated in relation to various $P_1-P_2$ values, referred to as AP. The 0.500-0.400 plastic unit possessed an open cross-section area of about 36 percent. The pressure was measured as inches of water column. FIG. 7 represents the results obtained over various mass flow values. The vortex pressure generated $P_1-P_2$ values were then modified or transformed into values of the square root and plotted against the same mass flows as found in FIG. 7. As may be seen a linear relationship is established using the modified or transformed $P_1-P_2$ values (MOD. $P_1-P_2$).

Figure 8:
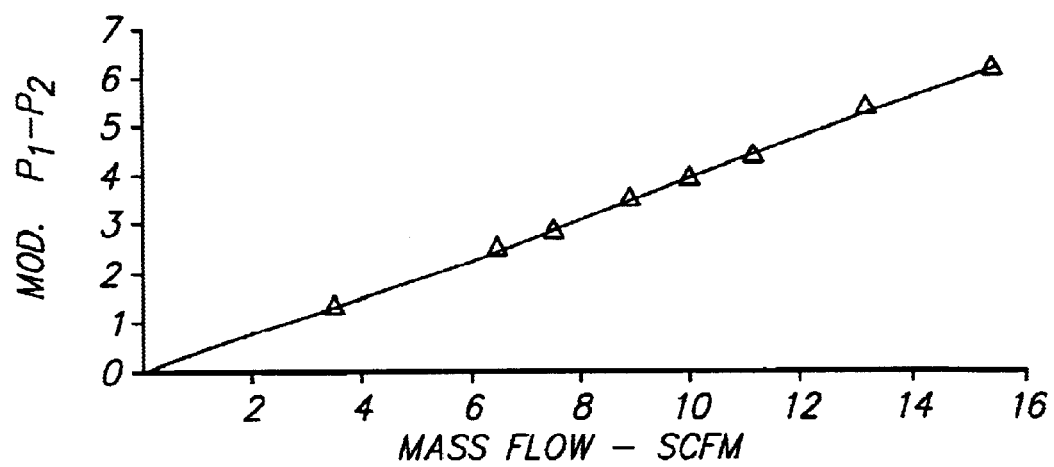
Figure 9:
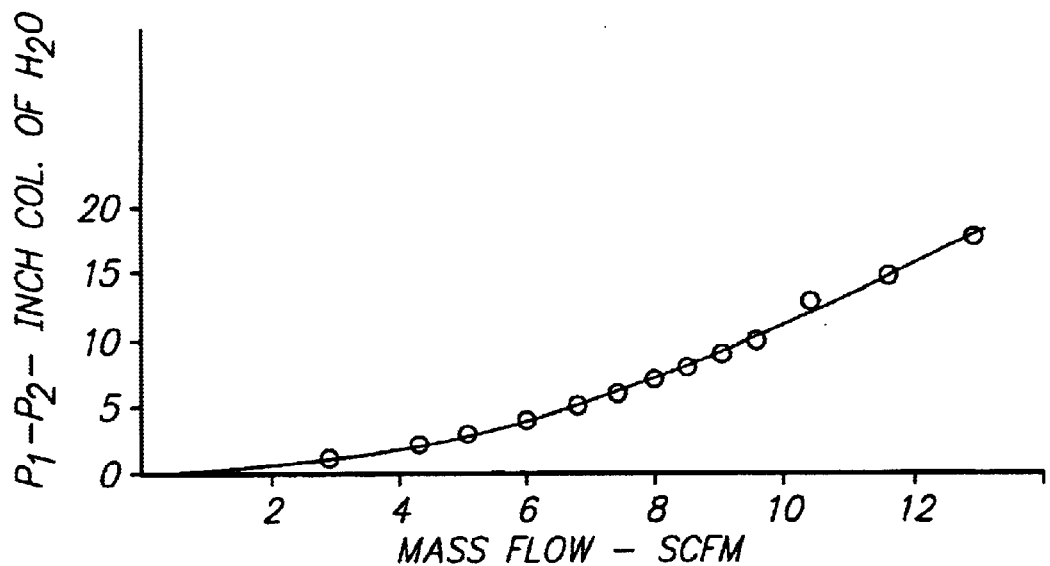
Figure 10:
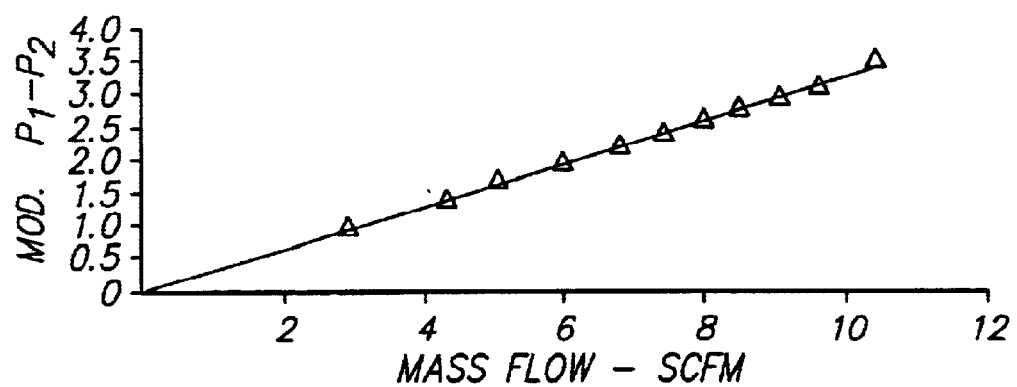

Reducing the flow with the identical unit (0.500-0.400 plastic flow body) the flow was reduced to a very low level. The results were plotted in FIG. 9 between $P_1-P_2$ and mass flow. FIG. 10 represents the same linear relationship achieved in FIG. 8 when the $P_1-P_2$ values are modified by taking the square root of the same. Thus, it was concluded that the square root of the $P_1-P_2$ value versus the mass flow of the fluid through device 10A represents a linear relationship and produces a very predictable extrapolation and interpolation for values lying along the line depicted in FIGS. 8 and 10. It should be noted that no preconditioning of the air passing through device 10 was employed to obtain the results depicted in FIGS. 7–10.

EXAMPLE III

Figure 12:
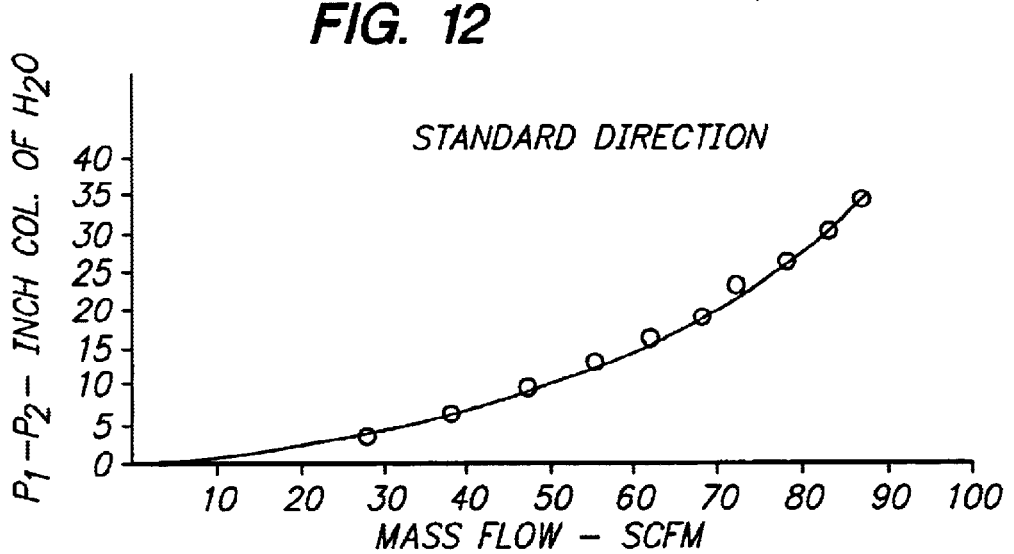
Figure 13:
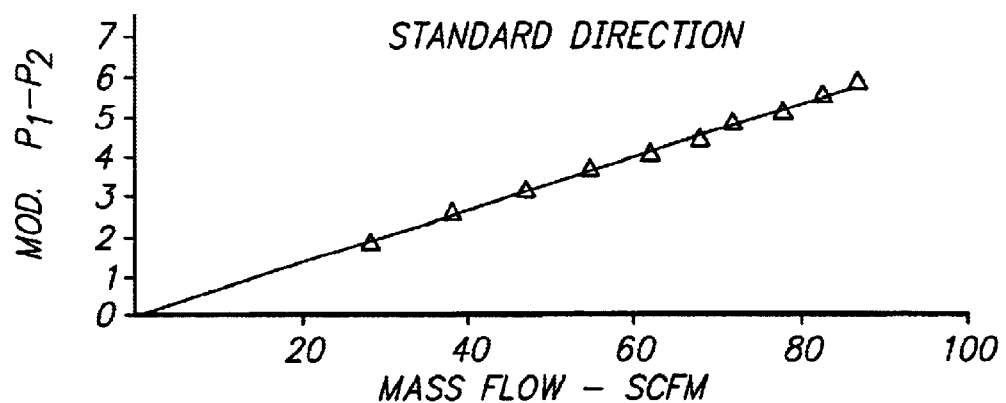

The testing described in Example II was again conducted using device 10A having a flow body identified as a 0.750-0.375 plastic unit. The cross-sectional area of the flow body of 0.750-.375 unit relative to the cross-sectional area of the chamber 22 of housing 12 produces an open area of greater than 70 percent. Air was passed through device 10A with the 0.750-0.375 flow body and the results were calculated in FIGS. 12 and 13 as a comparison between mass flow and $P_1-P_2$. In this "standard direction" the curved graph result of FIG. 12 was transformed into a straight line, again, by taking the square root of the $P_1-P_2$ values. This result is shown in FIG. 13.

Figure 4:
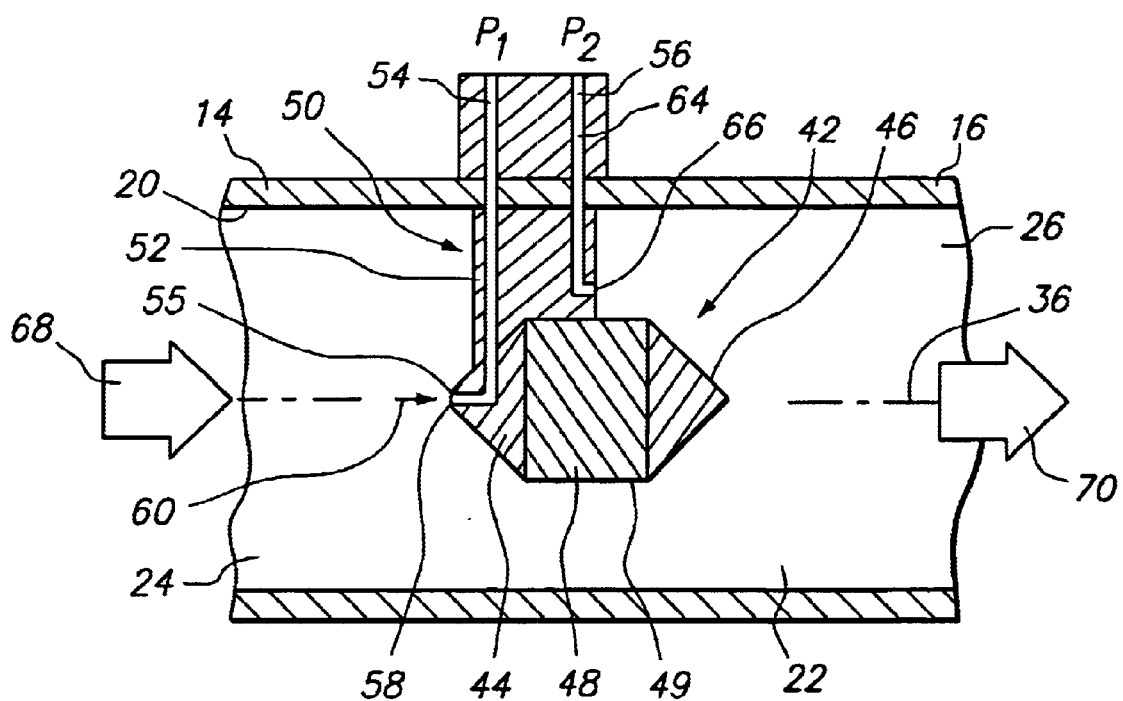
Figure 5:
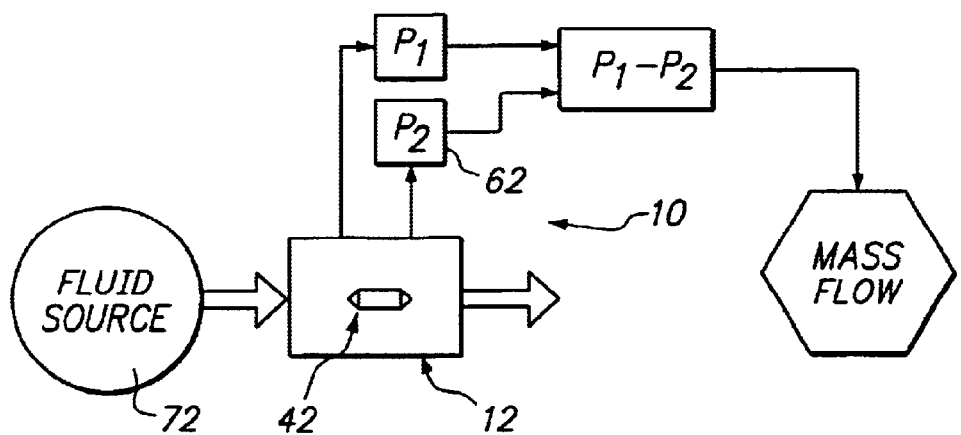
Figure 11:
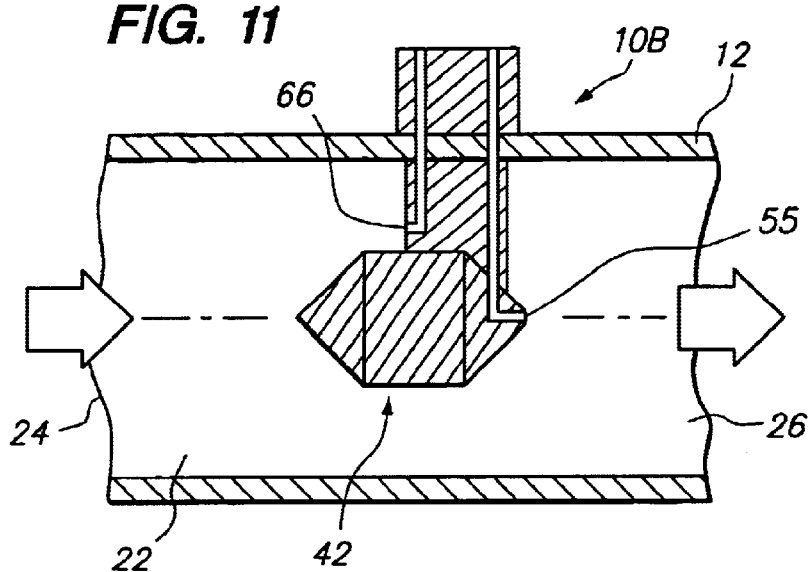
Figure 14:
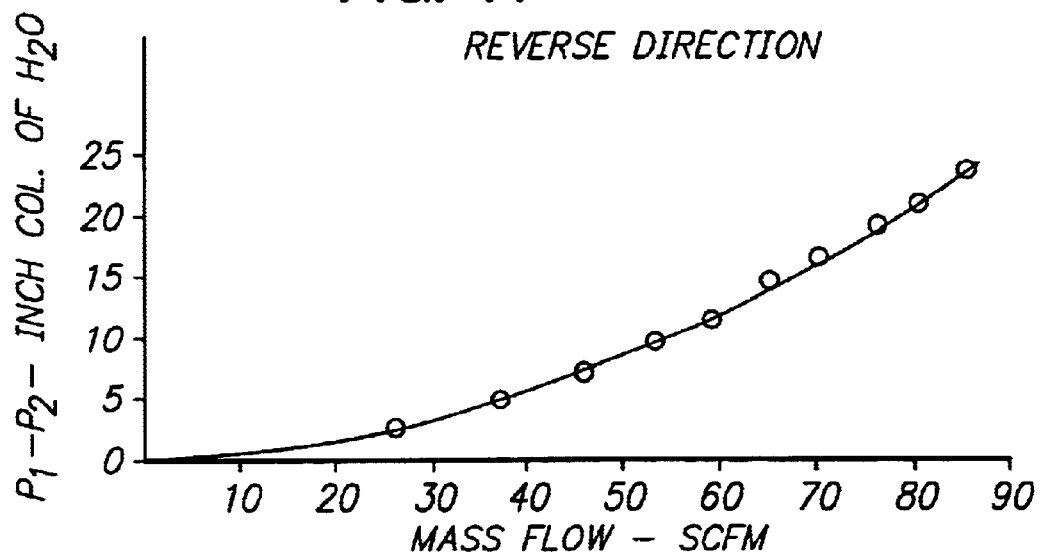
Figure 15:
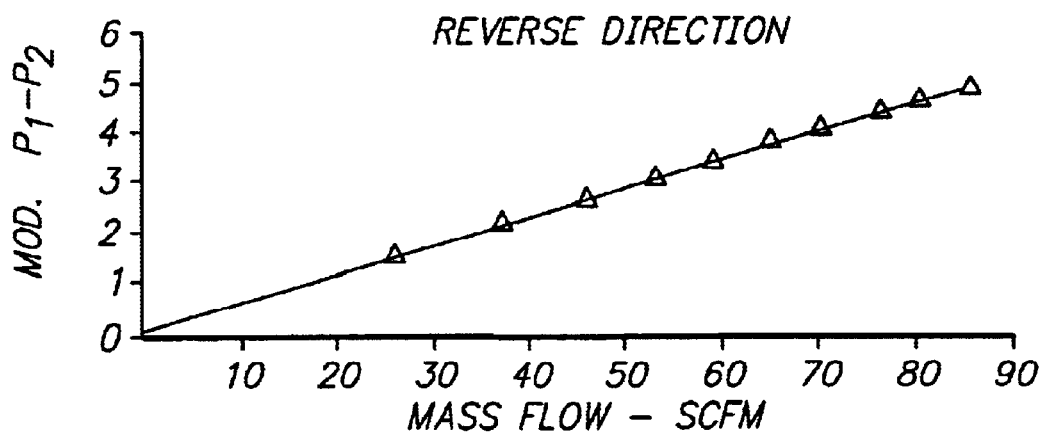
Figure 16:
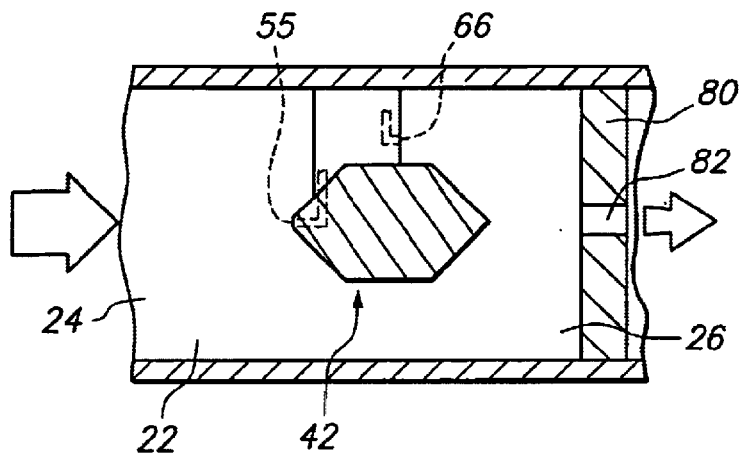

Referring now to FIG. 11, the flow body 42 was reversed such that opening 55 faced exit 26 of chamber 22 and opening 66 faced entrance 24 to chamber 22. This "reverse direction" orientation, device 10B, was then employed in the same manner as described hereinabove in the present Example. FIGS. 14 and 15 represent the mass flow determinations from the $P_1-P_2$ values and the modified $P_1-P_2$ values described in Example II. It was concluded that the device of the present invention operates satisfactorily in either the "standard direction", device 10A as depicted in FIG. 4 or in the "reverse direction", device 10B as depicted in FIG. 11.

EXAMPLE IV

Figure 17:
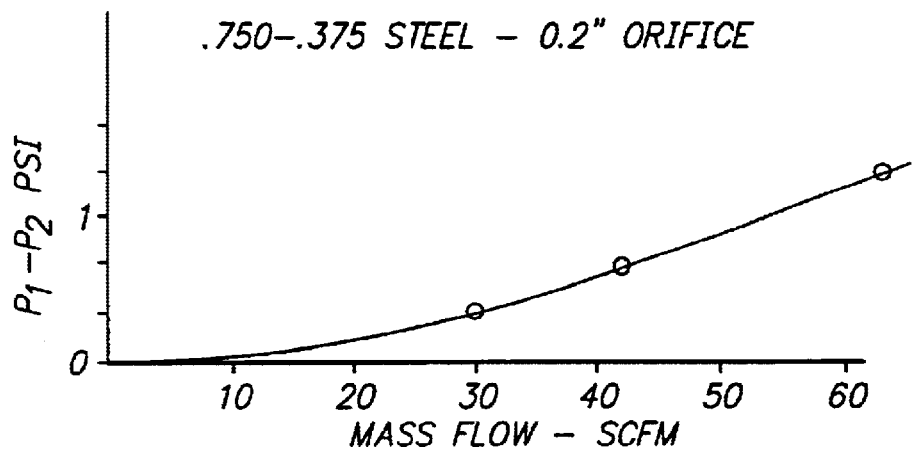

Compressibility effects were investigated by using device 10 of the present invention. In addition, an orifice plate 80 was placed within chamber-22 having an orifice 82 of a certain size. A 0.750-0.375 steel flow body 42, described in the prior Examples, was employed. The orifice opening 82 was set at 0.2 inches. FIG. 17 represents the mass flow versus $P_1-P_2$ results which resulted in a smooth curve. Modifying the $P_1-P_2$ values by taking the square root of each $P_1-P_2$ value resulted in a straight line.

Figure 18:
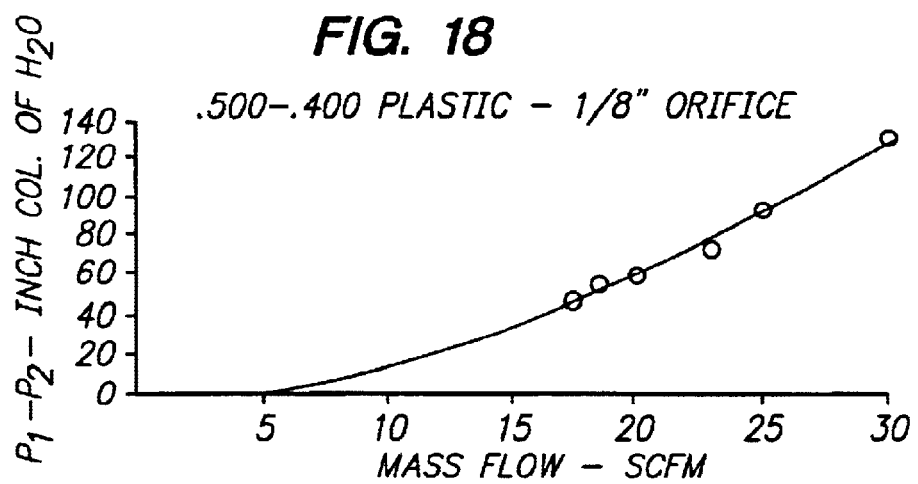

A 0.500-0.400 plastic flow body 42 was then substituted and the orifice opening 82 was set at 1/8 of an inch. FIG. 18 represents the values obtained for mass flow versus $P_1-P_2$ in this instance. Again, a smooth curve was obtained which is easily transformed into a straight line by taking the square root of each of the $P_1-P_2$ values, as was performed in the heretofore delineated Examples.

The measurements of this Example represents little or no compressibility effects due to backpressure provided by the orifice plate 80 and the orifice 82 thereof. Surprisingly, the temperature at the beginning of both runs was approximately 75° F. while at the end of the run the temperature was 120° F. Again compressibility corrections for temperature were not needed to provide the results shown in FIGS. 17 and 18.

Referring now to FIG. 19, another embodiment 10C of the present invention is depicted. Embodiment 10C represents an application of the flow device as depicted in embodiments 10A and 10B in a retrofit application. In this regard, device 10C represents the ability to measure mass flow in many environments. For example, the present invention may be employed to measure mass flow in medical gas modules, oxygen lines, oxygen masks, medical appliances such as nebulizers, anesthesia fluid and gas systems, and the like. In addition, blood pressure monitoring systems, pulmonary function testers, also can be easily adapted to employ the present invention to measure mass flow. Industrial gas cylinders, compressors, pumps, fans, fluid meters, paint spray systems, I.V. feed systems, and the like are equally amenable for using the present invention to measure mass flow.

Figure 21:
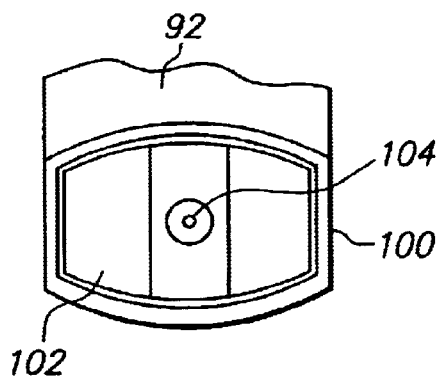
Figure 22:
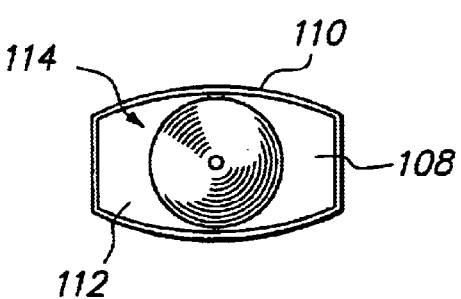
Figure 23:
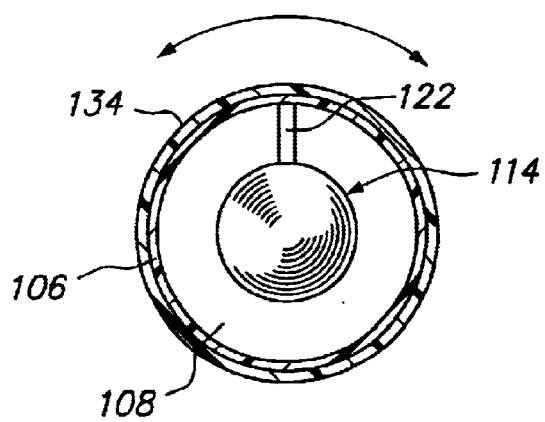

With reference to the particular embodiment depicted in FIG. 19, an inhalation aerosol delivery device 90 is depicted. Device 90 includes a support 92 which holds an aerosol canister 94 in place. Canister 94 is typically activated by pressing on base 96 according to directional arrow 98. For example, canister 94 may contain salmeterol xinafoate used to treat asthma. With reference to FIGS. 20 and 21, it may be observed that device 90 possesses a fluid exit 100 having a flow chamber 102. The aerosol emanating from canister 94 exits nozzle 104 when canister 96 is pressed, as hereinabove described.

Device 10C is adapted to receive aerosol generated by device 90 through the use of a housing 104. Housing 104 possesses a wall portion 106 forming a chamber 108 therewithin. Chamber 108 includes an entrance member 110 having an entrance chamber 112. Entrance member 110 slips into flow chamber 102 of fluid exit fitting 100. Thus, chamber 102 of fluid exit fitting 100 communicates with entrance chamber 112 of entrance member 110.

Flow body 114 is located within chamber 108. Flow body 114 includes a first conical portion 116, a second conical portion 118, and an intermediate cylindrical portion 120. Flow body 114 is similar to flow body 42 depicted in FIG. 11. Pylon 122 supports flow body 114 centrally within chamber 108. In addition, the measuring passageways determining $P_1$ and $P_2$ terminate in a open receptors 124 and 126.

An instrument, comparable to the pressure measuring system described with respect to embodiment 10A, FIGS. 1–5 may be employed in the form of a plug in schematically represented module 128 having a display 130 for indicating mass flow passing through chamber 108. Directional arrow 132 indicates the interconnection direction between module 128 and receptors 124 and 126.

In operation, the user activates aerosol delivery device 90 by pressing canister 94 according to directional arrow 98. Aerosol is then released from nozzle 104 and passes through chamber 102 of exit fitting 100 and into chamber 108 of entrance member 110 of device 10C. Flow body 114 then permits the measurement of mass flow within chamber 108 of device 10C. In addition, the aerosol is slowed and enhanced for ingestion by the user. That is to say, it is believed that the vortex eddy field generated by flow body 114 tends to polarize the aerosol particles to prevent lumping or agglomeration which would result in deposition within chamber 108. The aerosol is also warmed to room temperature which allows the user to comfortably ingest the aerosol generated by device 90.

Referring again to FIGS. 19 and 23 it may be observed that a rotatable ring 134 includes a multiplicity of slots such as slots 136 and 138. Slots 136 and 138 are alignable with slots through wall portion 106. FIG. 19 illustrates slot 136. The alignment of wall portion slot 136 and ring 140 in whole or in part permits air to pass into chamber 108 with the movement of the aerosol exiting fluid exit fitting 100 of device 90. Directional arrow 142 indicates the movement of air into chamber 108 in this manner.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fluid mass flow meter device, comprising:

a. a housing having a wall portion forming a chamber, said chamber possessing an entrance and an exit for passing fluid through said chamber;

b. a body located in said chamber said body including a first conical portion having a base and an apex positioned adjacent said chamber entrance, a second conical portion having a base and an apex positioned adjacent said chamber exit, and a cylindrical portion intermediately positioned relative to said first and second conical portions, said cylindrical portion having a first base and a second base, said base of said first conical portion lying against said first base of said cylindrical portion to orient said apex of said first conical portion toward said chamber entrance to contact fluid entering said chamber, said base of said second conical portion lying against second base of said cylindrical portion to orient said apex of said second conical portion toward said exit of said chamber to contact fluid passing through said chamber, said apexes of said first and second conical portions being free to directly contact fluid in said chamber;

c. support means for holding said body within said chamber;

d. a first pressure probe, said first pressure probe obtaining a first pressure measurement at the apex of said first conical portion of said body; and e. a second pressure probe, said second pressure probe obtaining a second pressure measurement at said cylindrical portion of said body.

2. The device of claim 1 in which said housing wall comprises a right circular cylinder having a central axis, said body lying along a central axis, said central axis of said body being coincident with said central axis of said right circular cylinder.

3. The device of claim 1 in which said wall portion of said housing further includes an outer surface and an inner surface surrounding said chamber and said support means for holding said body in said chamber comprises a projection depending from and connected to said inner surface of said housing.

4. The device of claim 1 in which said first and second pressure probes include a first and second passageway, respectively through said support means.

5. The device of claim 4 in which said support means comprises a projection depending from said inner wall of said housing.

6. The device of claim 4 in which said first and second passageways each terminate in an aperture within said housing chamber.

7. The device of claim 6 in which said aperture of said first passageway faces said entrance to said chamber and said aperture of said second passageway faces said exit to said chamber.

8. The device of claim 6 in which said aperture of said second passageway faces said entrance to said chamber and said aperture of said first passageway faces said exit to said chamber.

9. The device of claim 1 in which said body with said chamber is formed into an annulus for the, passage of fluid therethrough.

10. The device of claim 9 in which said housing wall comprises a right circular cylinder having a central axis, said body lying along a central axis, said central axis of said body being coincident with said central axis of said right circular cylinder.

11. The device of claim 9 in which said wall portion of said housing further includes an outer surface and an inner surface surrounding said chamber and said support means for holding said body in said chamber comprises a projection depending from said inner surface of said housing.

12. The device of claim 9 in which said first and second pressure probes include a first and second passageway, respectively through said support means.

13. The device of claim 12 in which said support means comprises a projection depending from and connected to said inner wall of said housing.

14. The device of claim 12 in which said first and second passageways each terminate in an aperture within said housing chamber.

15. The device of claim 14 in which said aperture of said first passageway faces said entrance to said chamber and said aperture of said second passageway faces said exit to said chamber.

16. The device of claim 1 which additionally comprises ventilation means for permitting fluid to enter said chamber of said housing other than through said chamber entrance.

17. The device of claim 16 in which said ventilation means comprises a rotatable member rotating relative to said housing wall portion, a first opening through said wall portion, and a second opening through said rotatable member, said first and second opening being alignable by rotation of said rotatable member.

18. A fluid flow modifying device employed in combination with a source of fluid moving at a certain velocity, and a generator having a fixture possessing a fluid exit, comprising:

a. a housing having a wall portion forming a chamber, said chamber possessing an entrance and an exit for passing the fluid through said chamber, said entrance of said housing linking with the generator fixture to permit communicating between the fluid source exit and said housing entrance; and b. a body located in said chamber said body including a first conical portion having a base and an apex positioned adjacent said chamber entrance, a second conical portion having a base and an apex positioned adjacent said chamber exit, and a cylindrical portion intermediately positioned relative to said first and second conical portions, said cylindrical portion having a first base and a second base, said base of said first conical portion lying against said first base of said cylindrical portion to orient said apex of said first conical portion toward said chamber entrance to contact fluid entering said chamber, said base of said second conical portion lying against second base of said cylindrical portion to orient said apex of said second conical portion toward said exit of said chamber to contact fluid passing through said chamber, said apexes of said first and second conical portions being free to directly contact fluid in said chamber.

19. The device of claim 18 which additionally comprises means for determining the pressure at first and second places on said body with said housing chamber.

* * * * *